(12) United States Patent
Muramatsu et al.

(10) Patent No.: US 10,927,256 B2
(45) Date of Patent: Feb. 23, 2021

(54) TRANSPARENT LIQUID SILICONE RUBBER COMPOSITION

(71) Applicant: SHIN-ETSU CHEMICAL CO., LTD., Tokyo (JP)

(72) Inventors: Hironobu Muramatsu, Annaka (JP); Shigeki Shudo, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 88 days.

(21) Appl. No.: 16/324,994

(22) PCT Filed: Jul. 20, 2017

(86) PCT No.: PCT/JP2017/026247
§ 371 (c)(1),
(2) Date: Feb. 12, 2019

(87) PCT Pub. No.: WO2018/055896
PCT Pub. Date: Mar. 29, 2018

(65) Prior Publication Data
US 2019/0225806 A1  Jul. 25, 2019

(30) Foreign Application Priority Data

Sep. 20, 2016 (JP) .............................. JP2016-182637

(51) Int. Cl.
*C08L 83/04* (2006.01)
*C08L 83/06* (2006.01)
*G02B 1/04* (2006.01)

(52) U.S. Cl.
CPC .............. *C08L 83/04* (2013.01); *C08L 83/06* (2013.01); *G02B 1/04* (2013.01); *C08L 2205/025* (2013.01); *C08L 2205/035* (2013.01)

(58) Field of Classification Search
CPC ...... C08G 77/12; C08G 77/20; C08G 77/045; C08G 77/16; C08G 77/70; C08L 2205/025
See application file for complete search history.

(56) References Cited

U.S. PATENT DOCUMENTS

| | | | | |
|---|---|---|---|---|
| 5,270,425 | A | * | 12/1993 | Vanwert .................. C08L 83/04 524/730 |
| 6,285,513 | B1 | | 9/2001 | Tsuji et al. |
| 2002/0161140 | A1 | | 10/2002 | Yoneda et al. |
| 2006/0159937 | A1 | | 7/2006 | Miyoshi et al. |
| 2006/0264567 | A1 | | 11/2006 | Shiobara et al. |
| 2006/0275617 | A1 | | 12/2006 | Miyoshi et al. |
| 2007/0197742 | A1 | | 8/2007 | Yamakawa |

FOREIGN PATENT DOCUMENTS

| | | | |
|---|---|---|---|
| JP | 8-134358 | A | 5/1996 |
| JP | 2000-231002 | A | 8/2000 |
| JP | 2000-235103 | A | 8/2000 |
| JP | 2002-265787 | A | 9/2002 |
| JP | 2006-202952 | A | 8/2006 |
| JP | 2006-342200 | A | 12/2006 |
| JP | 2007-246894 | A | 9/2007 |
| JP | 2008-163060 | A | 7/2008 |
| JP | 2009-091449 | A | 4/2009 |
| JP | 2016-084419 | A | 5/2016 |
| WO | WO 2010/138221 | A1 | 12/2010 |
| WO | WO 2016/098884 | A1 | 6/2016 |

OTHER PUBLICATIONS

International Search Report (PCT/ISA/210) issued in PCT/JP2017/026247, dated Aug. 29, 2017.
Written Opinion (PCT/ISA/237) issued in PCT/JP2017/026247, dated Aug. 29, 2017.
Extended European Search Report dated May 19, 2020, in European Patent Application No. 17852677.8.

* cited by examiner

*Primary Examiner* — Kuo Liang Peng
(74) *Attorney, Agent, or Firm* — Birch, Stewart, Kolasch & Birch, LLP

(57) ABSTRACT

The present invention provides a transparent liquid silicone rubber composition that does not contain an inorganic filler and includes the following as main components: (A) a silicone resin having, as essential structural units, an $R_3SiO_{1/2}$ unit (M unit) and a $SiO_{4/2}$ unit (Q unit) (R is a monovalent hydrocarbon group containing 1-6 carbon atoms, and at least 2 R's in a molecule are alkenyl groups); (B) a straight-chain or branched organopolysiloxane containing, in a molecule, 2 or more alkenyl groups bonded to silicon atoms; (C) an organohydrogenpolysiloxane containing, in a molecule, 2 or more hydrogen atoms bonded to silicon atoms; (D) an organopolysiloxane which is liquid at room temperature, having a weight-average molecular weight of 37,000 or less and containing, in a molecule, one or more hydroxyl groups bonded to silicon atoms; and (E) a hydrosilylation reaction catalyst. The present invention is a highly transparent, hydrosilylation-curable liquid silicone rubber composition, wherein the hardness and high transparency are sufficiently retained and the mold releasability is excellent.

3 Claims, No Drawings

TRANSPARENT LIQUID SILICONE RUBBER COMPOSITION

TECHNICAL FIELD

The present invention relates to a transparent liquid silicone rubber composition that includes an organopolysiloxane as a major component and is cured by hydrosilylation. More specifically, the invention relates to a transparent liquid silicone rubber composition from which moldings having a high hardness, high transparency and excellent mold releasability can be obtained and which is useful for the mass production of various materials for optical applications that are required to have durability.

BACKGROUND ART

High hardness, highly transparent silicone resins (see Patent Documents 1 to 3 below) are known to be used for such purposes as to improve the weather resistance of LED lights and various types of liquid-crystal monitor screens and as optical waveguides. In particular, use has come to be made of cured products of hydrosilylation-curable liquid silicone rubber compositions which contain no silica whatsoever and thus have a high transparency, do not undergo a loss of elasticity even at low temperatures, and moreover are relatively easy to mold by heat curing.

However, it is generally difficult to increase the hardness of silicone rubbers that contain no silica whatsoever as a reinforcement. Also, when attempts are made to excessively increase the crosslink density of the silicone rubber, the silicone rubber material ends up sticking to the mold when molding operations are repeatedly carried out, which is a critical defect for industrial purposes.

PRIOR ART DOCUMENTS

Patent Documents

Patent Document 1: JP-A 2002-265787
Patent Document 2: JP-A 2006-202952
Patent Document 3: JP-A 2006-342200

SUMMARY OF INVENTION

Technical Problem

It is therefore an object of the present invention to provide, in a hydrosilylation-curable liquid silicone rubber composition that is entirely free of inorganic fillers such as silica and has a high transparency, a silicone rubber composition which has excellent mold releasability while fully retaining the hardness and high transparency.

Solution to Problem

The inventors have conducted extensive investigations in order to achieve the above objects. As a result, they have found that by including a small amount of an organopolysiloxane which has a silicon-bonded hydroxyl group and is liquid at room temperature within a silicone rubber composition that is free of inorganic fillers, the hardness of the cured silicone can be fully manifested and the mold releasability when molding is repeatedly carried out can be improved. These discoveries ultimately led to the present invention.

Accordingly, this invention provides the following transparent liquid silicone rubber compositions.

[1]
A hydrosilylation-curable transparent liquid silicone rubber composition which is free of inorganic filler and includes:

(A) 100 parts by weight of a silicone resin containing, as essential constitutional units, $R_3SiO_{1/2}$ units (M units) and $SiO_{4/2}$ units (Q units) (wherein each R is a monovalent hydrocarbon group of 1 to 6 carbon atoms, with at least two R groups per molecule being alkenyl groups);

(B) from 50 to 250 parts by weight of a linear or branched organopolysiloxane containing at least two silicon-bonded alkenyl groups per molecule;

(C) an organohydrogenpolysiloxane containing at least two silicon-bonded hydrogen atoms per molecule, in an amount such that the number of silicon-bonded hydrogen atoms per silicon-bonded alkenyl group in components (A) and (B) is from 1.0 to 3.0;

(D) from 0.05 to 5 parts by weight of a liquid organopolysiloxane which has a weight-average molecular weight of not more than 37,000, contains at least one silicon-bonded hydroxyl group per molecule and is liquid at 25° C.; and (E) a catalytic amount of a hydrosilylation catalyst.

[2]
The transparent liquid silicone rubber composition of [1], wherein component (C) is a mixture obtained by mixing (C1) an organohydrogenpolysiloxane containing at least 0.01 mol/g of silicon-bonded hydrogen atoms with (C2) an organohydrogenpolysiloxane containing less than 0.01 mol/g of silicon-bonded hydrogen atoms in a weight ratio of between 5:95 and 95:5.

[3]
The transparent liquid silicone rubber composition of [1] or [2], wherein the liquid silicone rubber composition, when cured, has a hardness, as measured with a type A durometer by the method described in JIS K 6249:2003, of at least 60.

[4]
The transparent liquid silicone rubber composition of any of [1] to [3], wherein a 2 mm-thick cured sheet of the liquid silicone rubber composition has a total light transmittance, as measured in general accordance with JIS K 7361-1:1997, of at least 90%.

Advantageous Effects of Invention

Cured products which are of high transparency and high hardness and which also possess excellent injection moldability and mold releasability can be obtained from the transparent liquid silicone rubber composition of the invention. This composition is therefore ideal as a resin material for various types of mass-producible optical applications required to have durability.

DESCRIPTION OF EMBODIMENTS

The invention is described in detail below.
The transparent liquid silicone rubber composition of the invention is a hydrosilylation-curable composition which is free of inorganic filler and includes components (A) to (E) below:
(A) an alkenyl group-containing silicone resin in which $R_3SiO_{1/2}$ units (M units) and $SiO_{4/2}$ units (Q units) serve as essential constitutional units;
(B) a linear or branched organopolysiloxane containing at least two silicon-bonded alkenyl groups per molecule;

(C) an organohydrogenpolysiloxane containing at least two silicon-bonded hydrogen atoms per molecule;

(D) a liquid organopolysiloxane which has a weight-average molecular weight of not more than 37,000, contains at least one silicon-bonded hydroxyl group per molecule and is liquid at 25° C.; and (E) a hydrosilylation catalyst. [0010]

(A) Alkenyl Group-Containing Silicone Resin

Component (A) is a silicone resin in which the essential constituent units are $R_3SiO_{1/2}$ units (M units) and $SiO_{4/2}$ units (Q units). Here, each R is a monovalent hydrocarbon group of 1 to 6 carbon atoms, with at least two R groups, and preferably from three to eight R groups, per molecule being alkenyl groups.

The monovalent hydrocarbon group R of 1 to 6 carbon atoms in this silicone resin is exemplified by unsubstituted monovalent hydrocarbon groups, including alkyl groups such as methyl, ethyl, propyl, butyl, pentyl and hexyl groups; alkenyl groups such as vinyl, allyl, butenyl, pentenyl and hexenyl groups; and cyclohexyl, cyclohexenyl and phenyl groups. The plurality of R groups included in the silicone resin serving as component (A) may be the same or different. However, from the standpoint of compatibility with the other ingredients, it is preferable for at least 80 mol % of the R groups to be methyl groups. Also, to maintain a good compatibility with the other ingredients, it is preferable for vinyl groups to be used as the alkenyl groups.

Here, the ratio between the M units and the Q units is preferably such that the amount of M units per mole of Q units is from 0.6 to 1.2 moles, and more preferably from 0.8 to 1.0 mole. When there are too few M units, gelling readily arises; when there are too many M units, the resin structure remains undeveloped and a hardness-improving effect is not obtained.

As mentioned above, $R_3SiO_{1/2}$ units (M units) and $SiO_{4/2}$ units (Q units) are essential for component (A). However, units selected from among $R_2SiO_{2/2}$ (D units) and $RSiO_{3/2}$ units (T units) may also be included as optional constitutional units. To increase the hardness of the cured form of the hydrosilylation-curable liquid silicone rubber composition, the M units and Q units account for preferably at least 80 mol %, and more preferably at least 90 mol %, of all the constitutional units.

The silicone resin of component (A) is exemplified by copolymers of vinyldimethylsiloxy groups and Q units,
copolymers of vinyldimethylsiloxy groups/trimethylsiloxy groups and Q units,
copolymers of vinyldimethylsiloxy groups/dimethylsiloxane units and Q units,
copolymers of vinyldimethylsiloxy groups/phenylsilsesquioxane units and Q units,
copolymers of vinyldimethylsiloxy groups/dimethylsiloxane units/phenylsilsesquioxane units and Q units, and
copolymers of trimethylsiloxy groups/vinylmethylsiloxane units and Q units.

The molecular weight of the silicone resin serving as component (A), expressed as the weight-average molecular weight against a polystyrene standard as determined by gel permeation chromatography (GPC), is preferably from 2,000 to 8,000, and more preferably from 4,000 to 6,000. This silicon resin is generally a solid at room temperature.

In the present invention, the weight-average molecular weight refers to the weight-average molecular weight against a polystyrene standard, as measured by gel permeation chromatography (GPC) under the following conditions.

[Measurement Conditions]
Measurement apparatus: Eco SEC HLC-8320 GPC, from Tosoh Corporation
Detector: Differential refractometer (RI) and UV detector, used together
Column: TSKgel Super Multipore HZ-H (4.6 mm (I.D.)×15 cm×2) or TSKgel Super Multipore HZ2000 (6.0 mm (I.D.)× 15 cm×2)
Developing Solvent: Tetrahydrofuran (THF)
Flow rate: 0.35 mL/min
Column temperature: 40° C.
Amount of sample injected: 10 μL (THF solution having a concentration of 0.1 wt %)

(B) Alkenyl Group-Containing Organopolysiloxane

Component (B) is an organopolysiloxane that contains at least two silicon-bonded alkenyl groups per molecule. The organopolysiloxane of component (B) is not particularly limited as to the average degree of polymerization thereof. So long as it has two silicon-bonded alkenyl groups per molecule, use can be made of a known organopolysiloxane ordinarily used as the base polymer in hydrosilylation-curable liquid silicone rubbers. Component (B) may be an organopolysiloxane that is in the form of an oil or crude rubber at room temperature (25° C.), more preferably one that has a polystyrene-equivalent weight-average molecular weight as determined by GPC of from 5,000 to 1,000,000, and especially from 20,000 to 800,000, or may be a mixture of such organopolysiloxanes. These organopolysiloxanes are generally represented by the following average compositional formula (I)

$$R^1_a SiO_{(4-a)/2} \qquad (I),$$

are preferably linear, and may include some branching.

Here, $R^1$ in average compositional formula (I) is a monovalent hydrocarbon group of 1 to 6 carbon atoms. $R^1$ is exemplified by unsubstituted monovalent hydrocarbon groups, including alkyl groups such as methyl, ethyl, propyl, butyl, pentyl and hexyl groups; alkenyl groups such as vinyl, allyl, butenyl, pentenyl and hexenyl groups; and cyclohexyl, cyclohexenyl and phenyl groups. The above plurality of substituents may be the same or different, although it is critical for at least two alkenyl groups to be included on the molecule. In average compositional formula (I), the subscript 'a' is a positive number from 1.9 to 2.4, and preferably from 1.95 to 2.05.

Component (B) is exemplified by linear organopolysiloxanes in which the backbone consists of repeating diorganopolysiloxane units (D units) and both ends of the molecular chain are capped with triorganosiloxy groups (M units). The silicon-bonded substituents are preferably methyl groups or phenyl groups. The two or more silicon-bonded alkenyl groups which must be included per molecule are preferably vinyl groups. These may be located at the ends of the molecule chain or may be on side chains, although it is preferable for one each to be included at both ends.

To ensure hardness after curing, the amount of component (B) included per 100 parts by weight of component (A) is in the range of 50 to 250 parts by weight, and preferably from 100 to 180 parts by weight. When the amount included is lower than this range, a cured composition that is brittle and lacks flexibility results. On the other hand, when the amount exceeds this range, a cured composition that is soft results, which may be unsuitable for lens applications and the like.

(C) Organohydrogenpolysiloxane

Component (C) is an organohydrogenpolysiloxane that includes at least two silicon-bonded hydrogen atoms per molecule. Use can be made of a known organohydrogenpolysiloxane of average compositional formula (II) below

   (II).

Here, $R^2$ in average compositional formula (II) is a monovalent hydrocarbon group of 1 to 6 carbon atoms. This is exemplified by unsubstituted monovalent hydrocarbon groups, including alkyl groups such as methyl, ethyl, propyl, butyl, pentyl and hexyl groups; and cyclohexyl, cyclohexenyl and phenyl groups. Of these, methyl and phenyl groups are preferred. The subscript 'b' is a positive number from 0.7 to 2.1, preferably from 0.8 to 2.0; and the subscript 'c' is a positive number from 0.18 to 1.0, preferably from 0.2 to 1.0. The sum b+c is a positive number from 0.8 to 3.0, preferably from 1.0 to 2.5.

The organohydrogenpolysiloxane of component (C) has a molecular structure which may be linear, cyclic, branched, or a three-dimensional network structure. Suitable use can be made of one which is liquid at room temperature (25° C.) and in which the number of silicon atoms on the molecule (or the degree of polymerization) is from about 2 to about 300, and especially from about 4 to about 200. It is suitable for the polystyrene-equivalent weight-average molecular weight as determined by GPC to be from 500 to 20,000, and especially from 800 to 5,000. Silicon-bonded hydrogen atoms may be located at the ends of the molecular chain, on side chains, or both at the ends and on side chains.

The organohydrogenpolysiloxane serving as component (C) is exemplified by methylhydrogenpolysiloxanes capped at both ends with trimethylsiloxy groups, dimethylsiloxane-methylhydrogensiloxane copolymers capped at both ends with trimethylsiloxy groups, dimethylpolysiloxanes capped at both ends with dimethylhydrogensiloxy groups, dimethylsiloxane-methylhydrogensiloxane copolymers capped at both ends with dimethylhydrogensiloxy groups, methylhydrogensiloxane-diphenylsiloxane copolymers capped at both ends with trimethylsiloxy groups, methylhydrogensiloxane-diphenylsiloxane-dimethylsiloxane copolymers capped at both ends with trimethylsiloxy groups, cyclic methylhydrogenpolysiloxanes, cyclic methylhydrogensiloxane-dimethylsiloxane copolymers, cyclic methylhydrogensiloxane-diphenylsiloxane-dimethylsiloxane copolymers, copolymers consisting of $(CH_3)_2HSiO_{1/2}$ units and $SiO_{4/2}$ units, and copolymers consisting of $(CH_3)_2HSiO_{1/2}$ units, $SiO_{4/2}$ units and $(C_6H_5)SiO_{3/2}$ units.

To ensure the hardness of the cured form of the liquid silicone rubber composition, the amount of component (C) is adjusted so as to set the number of silicon-bonded hydrogen atoms per silicon-bonded alkenyl group in components (A) and (B) in the range of between 1.0 and 3.0, preferably between 1.5 and 2.5. At a number of silicon-bonded hydrogen atoms smaller than this range, the cured product may be soft and have surface tackiness. On the other hand, at a number of silicon-bonded hydrogen atoms in excess of this range, the cured product may be brittle and lack flexibility.

In this invention, the hardness of the cured product, as measured with a type A durometer by the method described in JIS K 6249:2003, is set to preferably to at least 60, and more preferably from 65 to 90, by adjusting components (A), (B) and (C). A method that can generally be used to substantially increase the hardness of this silicone rubber cured product involves increasing the crosslink density by including within the composition an organosiloxane that contains a larger number of alkenyl groups and an organohydrogensiloxane that contains a larger number of silicon-bonded hydrogen atoms. In particular, the desired hardness is more easily obtained at a larger ratio of the number of silicon-bonded hydrogen atoms per silicon-bonded alkenyl group in components (A) and (B). However, when this ratio is larger, deposition on the mold during the molding operation readily arises and the mold releasability decreases, along with which the mold may become troublesome to clean. As a result, it may not be possible to fully ensure the quality of the silicone cured product or the productivity may decrease. Hence, to achieve both sufficient hardness and sufficient mold releasability, it is necessary in this invention to add the subsequently described component (D) to the composition in an amount within a specific range.

In addition, by using as component (C) a mixture obtained by mixing (C1) an organohydrogenpolysiloxane containing at least 0.01 mol/g, preferably from 0.015 to 0.025 mol/g, of silicon-bonded hydrogen atoms with (C2) an organohydrogenpolysiloxane containing less than 0.01 mol/g, preferably between 0.005 and 0.009 mol/g, of silicon-bonded hydrogen atoms in a weight ratio of between 5:95 and 95:5, preferably between 10:90 and 90:10, and more preferably between 20:80 and 80:20, an even better mold releasability can be achieved. These components (C1) and (C2) may each be of one type used singly or may be of two or more types used together. Component (C1) is able to contribute primarily to improved hardness, and component (C2) is able to contribute to increased mold releasability. When the amount of component (C1) falls below the weight ratio 5:95, the hardness may be insufficient. On the other hand, when the amount of component (C1) exceeds the weight ratio 95:5, the mold releasability may decrease.

(D) Hydroxyl Group-Containing Liquid Organopolysiloxane

Component (D) is a linear or branched organopolysiloxane that is liquid at room temperature (25° C.), has a weight-average molecular weight of not more than 37,000, and contains at least one silicon-bonded hydroxyl group per molecule. This organopolysiloxane is represented by the following average compositional formula (III)

   (III), and may be linear or branched. Preferred examples of this organopolysiloxane include linear organopolysiloxanes in which the backbone consists of repeating diorganopolysiloxane units (D units).

Here, $R^2$ is a substituted or unsubstituted monovalent hydrocarbon group of 1 to 6 carbon atoms. $R^2$ is exemplified by unsubstituted monovalent hydrocarbon groups, including alkyl groups such as methyl, ethyl, propyl, butyl, pentyl and hexyl groups, alkenyl groups such as vinyl, allyl, butenyl, pentenyl and hexenyl groups, and also cyclohexyl, cyclohexenyl and phenyl groups; and substituted monovalent hydrocarbon groups, including substituted alkyl groups in which at least some hydrogen atoms on the above monovalent hydrocarbon groups are substituted with halogen atoms or cyano groups, such as 3,3,3-trifluoropropyl and cyanomethyl groups. The plurality of substituents may be the same or different, with methyl or phenyl groups being preferred, and must include at least one hydroxyl group per molecule. The hydroxyl group may be located at the end of the molecular chain or on a side chain, although a hydroxyl group included at the end is preferred. Also, the subscript 'b' is a positive number from 1.9 to 2.4, preferably from 1.95 to 2.05.

Such organopolysiloxanes used here as component (D) are generally main component polymers for hydrolytic condensation-type liquid silicone rubber compositions or are used in high-temperature treatment as wetting agents for dispersing inorganic fillers such as silica in silicone compositions. They are generally not added to hydrosilylation-curable liquid silicone rubber compositions containing no inorganic filler because they cause declines in the physical properties.

Although the mechanism by which the mold releasability improves with the addition of component (D) is not fully understood, it is thought that the silicon-bonded hydroxyl groups have, for example, a masking action on functional groups for adhesion, which is a characteristic of the silicone resin serving as component (A), or have a masking action on silicon-bonded, highly reactive, hydrogen atoms within the organohydrogenpolysiloxane of component (C).

Component (D) has a weight-average molecular weight of not more than 37,000. At a weight-average molecular weight in excess of 37,000, the mold releasability-enhancing effect decreases. The weight-average molecular weight is preferably from 150 to 8,000, and more preferably from 300 to 4,000. The weight-average molecular weight used here is a value obtained by measurement under the measurement conditions described above.

Component (D) is added in an amount per 100 parts of component (A) of from 0.05 to 5 parts by weight, and preferably from 0.1 to 3 parts by weight. When the amount of addition is lower than this range, a mold releasability-enhancing effect is not apparent; when the amount of addition exceeds this range, it is impossible to ignore the amount of deposition on the mold and mold cleaning becomes troublesome.

(E) Hydrosilylation Catalyst

Component (E) is a hydrosilylation catalyst. This hydrosilylation catalyst may be a known catalyst. Examples include platinum black, platinic chloride, chloroplatinic acid, reaction products of chloroplatinic acid and monohydric alcohols, complexes of chloroplatinic acid and olefins, palladium catalysts and rhodium catalysts. Of these, the use of complexes of chloroplatinic acid and olefins is preferred. The hydrosilylation catalyst is included in a catalytic amount. Specifically, the amount of hydrosilylation catalyst included, based on the weight of platinum family metal atoms with respect to the combined weight of components (A) to (E), is preferably from about 0.1 ppm to about 200 ppm, and more preferably from about 1 ppm to about 50 ppm. At a catalyst content in excess of 200 ppm, the resulting cured product may incur yellow discoloration and may undergo a loss of transparency.

The transparent liquid silicone rubber composition of the invention has a total light transmittance, as measured by a method in general accordance with JIS K 7361-1:1997 using a 2 mm thick sheet of the cured product, of at least 90%. It is undesirable for a sheet of the cured product to have a total light transmittance below 90% because such a cured product is unfavorable for use in optical applications such as lamp housings and resin lenses.

Other Added Components

Silicon-bonded alkenyl group-containing organopolysiloxanes other than above components (A) and (B), alkoxysilyl group-containing alkoxysilane compounds, silane coupling agents, titanium- or zirconium-based condensation catalysts and the like may also be included as crosslinking co-agents in the transparent liquid silicone rubber composition of the invention, within ranges that do not detract from the advantageous effects of the invention.

Moreover, hydrosilylation reaction regulators, including polyalkenyl groups such as 1,3-divinyl-1,1,3,3-tetramethyldisiloxane, 1,3,5,7-tetramethyl-1,3,5,7-tetravinylcyclotetrasiloxane and 1,3,5-triallyl-1,3,5-triazine-2,4,6-(1H, 3H, 5H)-trione (triallyl isocyanurate), and acetylene alcohol derivatives such as 1-ethynylcyclohexanol, 3-methyl-1-butyn-3-ol, 3-methyl-1-pentyn-3-ol and 3,5-dimethyl-1-hexyn-3-ol may also be added to the silicone rubber composition of the invention in order to ensure the pot life of the composition.

In addition, various dyes, flame retardants and the like may be included in the silicone rubber composition of the invention within ranges that do not detract from the advantageous effects of the invention. Because silica and other inorganic fillers are deleterious to the transparency, a characteristic of the inventive silicone rubber composition is that it contains no inorganic filler. Moreover, with regard to flame retardants, inorganic flame retardants also may be detrimental to the transparency of the inventive silicone rubber composition and therefore are undesirable. Each of these optional components may be of one type used alone or of two or more types used together.

The transparent liquid silicone rubber composition of the invention can be prepared by uniformly mixing together each of the above ingredients using an ordinary mixing agitator, kneader or the like. A cured product of the transparent liquid silicone rubber composition can be obtained by uniformly mixing together each of the ingredients to prepare the silicone rubber composition, and then heat curing the composition at between 80 and 350° C., preferably between 100 and 200° C., and more preferably between 120 and 150° C. A known thermoset resin molding method may be used as the molding method. For example, when a pressing method is used, the hydrosilylation-curable transparent liquid silicone rubber composition of the invention may be cast between two liners and vulcanized under applied pressure using a given mold and under given conditions. Alternatively, when a two-liquid mixing type liquid injection molding machine is used, a cured product of the desired shape is obtained using any suitable mold, enabling a molded article suitable for optical applications or the like to be obtained. Additionally, two-color molding with another resin is also possible. Other means that may be employed include compression molding, transfer molding and injection molding. Also, as an example of stretch forming, the transparent liquid silicone rubber composition of the invention may be fed between two continuous resin films and at the same time stretched to a fixed thickness with rolls, and then continuously fed to a heating furnace where it is hot-air vulcanized at normal pressure. After curing, the cured composition is cooled and then peeled from the liners, enabling a desired transparent cured product in sheet form to be obtained.

EXAMPLES

The invention is illustrated more fully below by way of Working Examples and Comparative Examples, although the invention is not limited by these Examples. The amounts of the included ingredients are given in parts by weight.

Working Examples 1 to 7 and Comparative Examples 1 to 7

The respective amounts of (A) silicone resin, (B) alkenyl group-containing organopolysiloxane, (C) organohydrogenpolysiloxane, (D) hydroxyl group-containing liquid organopolysiloxane, (E) hydrosilylation catalyst and (F) hydrosilylation reaction regulator included in the respective examples of hydrosilylation-curable transparent liquid silicone rubber compositions are shown in Table 1. Each composition was uniformly mixed and stirred, and then vacuum degassed.

A polyethylene terephthalate (PET) liner and a 2.2 mm-thick frame were stacked together on top of a press plate, and the hydrosilylation-curable liquid silicone rubber composition was cast into this frame. A PET liner and a press plate were additionally stacked on top thereof, and pressing was carried out at 120° C. for 10 minutes. The two PET liners with the composition therebetween were removed together and cooled, following which the PET liners were peeled away, giving a transparent silicone rubber sheet having a thickness of about 2 mm.

The following physical properties of the silicone rubber compositions in the respective Working Examples and Comparative Examples were evaluated. The results are presented in Table 1.

Mold releasability: Using the ARBURG 420C/Allrounder 1000-150 as the molding machine, molding was carried out at 170° C. for 90 seconds, and the number of molding cycles until air pressure demolding became impossible was counted.

Hardness: JIS K 6249:2003 (2 mm sheet)

Transparency: The total light transmittance of a 2 mm-thick sheet was measured by a method in general accordance with JIS K 7361-1:1997 using a haze meter (name of apparatus: HGM-2, from Suga Test Instruments Co., Ltd.)

Flexibility: A 0.2 mm-thick transparent sheet was obtained in the same way as described above using a 0.22 mm-thick frame. A test piece having a length of 60 mm and a width of 20 mm was cut out of this 0.2 mm-thick sheet and, at substantially the center of the test piece in the lengthwise direction, was folded in two, both toward the front and toward the back. If cracks did not form and breakage did not occur at the fold, the test piece was judged to have passed the test.

Regarding the "Overall Evaluation" in Table 1, when items (1) to (4) below were all satisfied, the composition was rated as "O." When the mold releasability was such that it took 40 to 50 molding cycles until sticking occurred and the other items were satisfied, the composition was rated as "Δ." All other compositions were rated as "X."

(1) Mold releasability: Number of molding cycles until sticking occurs>50 cycles.
(2) Rubber hardness obtained with Durometer A is 60 or more.
(3) Transparency: Total light transmittance is 90% or more.
(4) Flexibility is acceptable.

[Materials Used]
(A) Silicone Resins
A-1: A copolymer of $(CH_3)_3SiO_{1/2}$ units, $(CH_2=CH)(CH_3)_2SiO_{1/2}$ units and $SiO_{4/2}$ units; M unit/Q unit (molar ratio)= 0.90; number of alkenyl groups per molecule, 4.2 (weight-average molecular weight=3,000)
A-2: A copolymer of $(CH_3)_3SiO_{1/2}$ units and $SiO_{4/2}$ units; M unit/Q unit (molar ratio)=0.80; number of alkenyl groups per molecule, 0 (weight-average molecular weight=3,000)
(B) Alkenyl Group-Containing Organopolysiloxanes
B-1: A dimethylpolysiloxane capped at both ends with dimethylvinylsiloxy groups; average degree of polymerization, 750 (weight-average molecular weight=56,000); viscosity, 30 Pa·s; number of alkenyl groups per molecule, 2

B-2: A dimethylpolysiloxane capped at both ends with dimethylvinylsiloxy groups; average degree of polymerization, 450 (weight-average molecular weight=33,000); viscosity, 5 Pa·s; number of alkenyl groups per molecule, 2
B-3: A vinylmethylsiloxane-dimethylsiloxane copolymer capped at both ends with trimethylsiloxy groups; average degree of polymerization, 750 (weight-average molecular weight=56,000); viscosity, 30 Pa·s; number of alkenyl groups per molecule, 3.8
B-4: A vinylmethylsiloxane-dimethylsiloxane copolymer capped at both ends with dimethylvinylsiloxy groups; average degree of polymerization, 8,000 (weight-average molecular weight=600,000); number of alkenyl groups per molecule, 33
B-5: A dimethylpolysiloxane capped at both ends with trimethylsiloxy groups; average degree of polymerization, 1,100 (weight-average molecular weight=about 80,000); number of alkenyl groups per molecule, 0
(C) Organohydrogenpolysiloxanes
C-1: A methylhydrogenpolysiloxane capped at both ends with trimethylsiloxy groups; weight-average molecular weight, 2,500; number of SiH groups per molecule, 40 (SiH group content, 0.016 mol/g)
C-2: A dimethylsiloxane-methylhydrogensiloxane copolymer capped at both ends with trimethylsiloxy groups; weight-average molecular weight, 4,100; number of SiH groups per molecule, 45 (SiH group content, 0.011 mol/g)
C-3: A dimethylsiloxane-methylhydrogensiloxane copolymer capped at both ends with trimethylsiloxy groups; weight-average molecular weight, 2,800; number of SiH groups per molecule, 20 (SiH group content, 0.0073 mol/g)
C-4: A copolymer resin of $(CH_3)_3SiO_{1/2}$ units, $H(CH_3)_2SiO_{1/2}$ units and $SiO_{4/2}$ units; weight-average molecular weight, 3,300; number of SiH groups per molecule, 30 (SiH group content, 0.0092 mol/g)
(D) Hydroxysilyl Group-Containing Organopolysiloxanes
D-1: A dimethylpolysiloxane capped at both ends with hydroxydimethylsiloxy groups; average degree of polymerization, 16 (weight-average molecular weight=1,200); number of silicon-bonded hydroxyl groups per molecule, 2
D-2: A dimethylpolysiloxane capped at both ends with hydroxydimethylsiloxy groups; average degree of polymerization, 4.5 (weight-average molecular weight=350); number of silicon-bonded hydroxyl groups per molecule, 2
D-3: A dimethylpolysiloxane capped at, on average, one end with a hydroxydimethylsiloxy group; average degree of polymerization, 34 (weight-average molecular weight=2,500); number of silicon-bonded hydroxyl groups per molecule, 1
D-4: A dimethylpolysiloxane capped at both ends with hydroxydimethylsiloxy groups; average degree of polymerization, 450 (weight-average molecular weight=33,000); number of silicon-bonded hydroxyl groups per molecule, 2
D-5: A dimethylpolysiloxane capped at both ends with hydroxydimethylsiloxy groups; average degree of polymerization, 530 (weight-average molecular weight=39,200); number of silicon-bonded hydroxyl groups per molecule, 2
D-6: A dimethylpolysiloxane capped at both ends with trimethylsiloxy groups; average degree of polymerization, 90 (weight-average molecular weight=6,600); number of silicon-bonded hydroxyl groups per molecule, 0
(E) Hydrosilylation Catalyst
E-1: Platinum catalyst (Pt concentration, 1 wt %)
(F) Hydrosilylation Reaction Regulator
F-1: 1-Ethynylcyclohexanol

TABLE 1

| | | Working Example | | | | | | |
|---|---|---|---|---|---|---|---|---|
| | | 1 | 2 | 3 | 4 | 5 | 6 | 7 |
| Silicone composition | A-1 | 100.0 | 100.0 | 100.0 | 100.0 | 100.0 | 100.0 | 100.0 |
| | A-2 | | | | | | | |
| | B-1 | 100.0 | | 100.0 | 100.0 | 140.0 | 100.0 | |
| | B-2 | | 100.0 | | | | | 100.0 |
| | B-3 | | | 20.0 | | | | |
| | B-4 | 40.0 | 40.0 | | 40.0 | | 40.0 | 40.0 |
| | C-1 | | 1.5 | | | | | |
| | C-2 | 5.0 | | 8.0 | 4.0 | 5.0 | 10.0 | 18.0 |
| | C-3 | 10.0 | 15.0 | 15.0 | 15.0 | 6.0 | | |
| | C-4 | 9.0 | | | 12.0 | | 9.0 | |
| | D-1 | 0.2 | | | | | | 0.2 |
| | D-2 | | 0.5 | | | 0.1 | | |
| | D-3 | | | 2.0 | | | | |
| | D-4 | | | | 4.5 | | | |
| | D-5 | | | | | | | |
| | D-6 | | | | | | | |
| | E-1 | 0.1 | 0.1 | 0.1 | 0.1 | 0.1 | 0.1 | 0.1 |
| | F-1 | 0.05 | 0.05 | 0.05 | 0.05 | 0.05 | 0.05 | 0.05 |
| | SiH group ratio | 2.3 | 2.5 | 2.2 | 2.9 | 1.1 | 2.1 | 2.2 |
| Evaluations | Mold releasability | >50 | >50 | >50 | >50 | >50 | >50 | 47 |
| | Hardness | 78 | 73 | 83 | 82 | 64 | 84 | 75 |
| | Transparency | 95 | 94 | 95 | 92 | 94 | 94 | 95 |
| | Flexibility | pass | pass | pass | pass | pass | pass | pass |
| | Overall evaluation | ○ | ○ | ○ | ○ | ○ | ○ | Δ |

| | | Comparative Example | | | | | | |
|---|---|---|---|---|---|---|---|---|
| | | 1 | 2 | 3 | 4 | 5 | 6 | 7 |
| Silicone composition | A-1 | | 100.0 | 100.0 | 100.0 | 100.0 | 100.0 | 100.0 |
| | A-2 | 100.0 | | | | | | |
| | B-1 | 100.0 | 100.0 | 100.0 | 100.0 | 100.0 | 100.0 | 100.0 |
| | B-2 | | | | | | | |
| | B-3 | | | | | | | |
| | B-4 | 40.0 | 40.0 | 40.0 | 40.0 | 40.0 | 40.0 | 40.0 |
| | C-1 | | | | | | | |
| | C-2 | | 15.0 | 4.0 | 5.0 | 5.0 | 10.0 | 10.0 |
| | C-3 | 15.0 | 5.0 | 5.0 | 10.0 | 10.0 | 5.0 | 5.0 |
| | C-4 | | 9.0 | | 9.0 | 9.0 | 9.0 | 9.0 |
| | D-1 | 0.2 | 0.2 | 0.2 | | 6.0 | 0.04 | |
| | D-2 | | | | | | | |
| | D-3 | | | | | | | |
| | D-4 | | | | | | | |
| | D-5 | | | | 4.5 | | | |
| | D-6 | | | | | | | 0.04 |
| | E-1 | 0.1 | 0.1 | 0.1 | 0.1 | 0.1 | 0.1 | 0.1 |
| | F-1 | 0.05 | 0.05 | 0.05 | 0.05 | 0.05 | 0.05 | 0.05 |
| | SiH group ratio | 2.3 | 3.1 | 0.9 | 2.3 | 2.3 | 2.5 | 2.5 |
| Evaluations | Mold releasability | — | 28 | — | 32 | >50 | 34 | 25 |
| | Hardness | defective curing | 88 | 51 | 66 | 73 | 76 | 75 |
| | Transparency | | 92 | 92 | 94 | 84 | 95 | 95 |
| | Flexibility | | fail | pass | pass | pass | pass | pass |
| | Overall evaluation | X | X | X | X | X | X | X |

The invention claimed is:

1. A hydrosilylation-curable transparent liquid silicone rubber composition which is free of inorganic filler and comprises:
- (A) 100 parts by weight of a silicone resin containing, as essential constitutional units, $R_3SiO_{1/2}$ units (M units) and $SiO_{4/2}$ units (Q units) (wherein each R is a monovalent hydrocarbon group of 1 to 6 carbon atoms, with at least two R groups per molecule being alkenyl groups);
- (B) from 50 to 250 parts by weight of a linear or branched organopolysiloxane containing at least two silicon-bonded alkenyl groups per molecule;
- (C) an organohydrogenpolysiloxane containing at least two silicon-bonded hydrogen atoms per molecule, in an amount such that the number of silicon-bonded hydrogen atoms per silicon-bonded alkenyl group in components (A) and (B) is from 1.0 to 3.0;
- (D) from 0.05 to 5 parts by weight of a liquid organopolysiloxane which has a weight-average molecular weight of not more than 37,000, contains at least one silicon-bonded hydroxyl group per molecule and is liquid at 25° C.; and
- (E) a catalytic amount of a hydrosilylation catalyst, wherein component (C) is a mixture obtained by mixing (C1) an organohydrogenpolysiloxane containing at least 0.01 mol/g of silicon-bonded hydrogen atoms with (C2) an organohydrogenpolysiloxane containing less than 0.01 mol/g of silicon-bonded hydrogen atoms in a weight ratio of between 5:95 and 95:5.

2. The transparent liquid silicone rubber composition of claim 1, wherein the liquid silicone rubber composition, when cured, has a hardness, as measured with a type A durometer by the method described in JIS K 6249:2003, of at least 60.

3. The transparent liquid silicone rubber composition of claim 1, wherein a 2 mm-thick cured sheet of the liquid silicone rubber composition has a total light transmittance, as measured in accordance with JIS K 7361-1:1997, of at least 90%.

* * * * *